Feb. 1, 1966 U. FREYDE 3,231,988
ELECTRO-MAGNETIC INSTRUCTIONAL AND AMUSEMENT DEVICE
Filed Jan. 23, 1963
5 Sheets-Sheet 1

INVENTOR.
UDO FREYDE

BY

AGENT

Feb. 1, 1966  U. FREYDE  3,231,988
ELECTRO-MAGNETIC INSTRUCTIONAL AND AMUSEMENT DEVICE
Filed Jan. 23, 1963  5 Sheets-Sheet 2

INVENTOR
UDO FREYDE
BY
AGENT

Feb. 1, 1966     U. FREYDE     3,231,988
ELECTRO-MAGNETIC INSTRUCTIONAL AND AMUSEMENT DEVICE
Filed Jan. 23, 1963     5 Sheets-Sheet 3

INVENTOR.
UDO FREYDE
BY
AGENT

Feb. 1, 1966 U. FREYDE 3,231,988
ELECTRO-MAGNETIC INSTRUCTIONAL AND AMUSEMENT DEVICE
Filed Jan. 23, 1963 5 Sheets-Sheet 4

INVENTOR.
UDO FREYDE
BY
AGENT

Feb. 1, 1966 U. FREYDE 3,231,988
ELECTRO-MAGNETIC INSTRUCTIONAL AND AMUSEMENT DEVICE
Filed Jan. 23, 1963 5 Sheets-Sheet 5

FIG. 18

INVENTOR.
UDO FREYDE
BY
AGENT 3,231,988
ELECTRO-MAGNETIC INSTRUCTIONAL AND
AMUSEMENT DEVICE
Udo Freyde, 62 Birkbuschstrasse,
Berlin-Steglitz, Germany
Filed Jan. 23, 1963, Ser. No. 253,789
Claims priority, application Germany Jan. 2, 1962
25 Claims. (Cl. 35—11)

The invention relates to an equipment for play and instruction designed to imitate the movement of vehicles in road traffic by means of switching and control means with which, as in real power vehicles, all the effects of starting, gear-changing, clutching, braking, steering, signalling, etc. are transmitted to a miniature motorcar on a game board provided with stretches of road.

The invention also relates to a variable design of the board by inclusion of stretches of road, rows of houses, country roads, race tracks, etc., so that the board provides the user with a reproduction scaled to the miniature motorcar of an urban or rural section to be driven through. Furthermore, the invention relates to an equipment for play and instruction in which two or more systems of the above-mentioned switching and control means are placed opposite each other, at right angles or laterally to each other on one board as above, so that two or several users can participate simultaneously on the same board—each user having a miniature motor car under his or her control.

Play and instructional equipment of this kind is generally known. In one of these equipments, a magnet is moved by control means underneath a non-magnetic game board so as to influence a miniature motor car above the board, which is provided with an iron core or a magnet, as is the case in the present invention. However, the magnet according to the prior-art equipment moves merely in a circle or a spiral, so that, e.g., driving out the decks of the playing area or a straight radial drive to the middle of the board is impossible.

Further, the naturalistic reproduction of the controls is restricted to an instrument board while the steering wheel, gear-change system, accelerator, brake, clutch, etc., in the usual design for motor cars and their arrangement are absent.

In another known equipment, on the other hand, the steering means is designed with high technical refinement necessarily expensive in manufacture. In this device not only every corner of the board, to the right, left, forward and backward or parallel to the sides and also diagonally can be driven over, but also extremely accurate curves can be executed. This is achieved by a complicated arrangement of several pilot motors and a rheostat with which not only movements of the miniature motor car on the board, designed as a system of co-ordinates, can be executed both horizontally and vertically and as a combination resultant of both equally rapid movements in diagonal direction, but the driving motors for the vertical and horizontal movement, by turning of the steering wheel, are fed with electric current in reverse proportion in increasing and/or decreasing voltage, so that in accordance with the steering wheel position or movement, different and variable speeds of the two co-ordinate movements result, and at will smaller or greater circles or curves or curves composed of various arcs of circles can be driven with the miniature motor car. On the relatively small game board the reproduction of all possible circular or curved figures possible by the use of this technical arrangement are hardly perceptible, so that compared to the effect required the technical outlay must be considered unnecessary here.

Other known equipments are provided with an endless circulating game board and/or a roadway of flexible material. However, this offers only one direction of drive to the magnetically influenced vehicle, variable only by left or right turning.

In all known equipments the major disadvantage prevails that while naturalistic imitation of the controls, exactly as in a power vehicle, is aspired to, this is not achieved to perfection. The same applies to the design of the game board. It is true that road indications, miniature houses for setting up, etc. have been proposed, but these only incompletely fulfill their purpose, for they provide only slight scope for varying the road or landscape scene, do not form roads limited by curbstones, and toy houses, though they can be placed in rows, cannot be correctly aligned or placed so as to form a street corner.

Finally, in the known games it is a disadvantage to the mobility of the magnet in the sense of a system of co-ordinates underneath the board that the vertical co-ordinate movement, carried out by a horizontally arranged, bilaterally guided bar, must be effected by a draw cord engaging at both ends of the bar, guided parallel and intersecting itself.

The above disadvantages are dispensed with in the equipment according to the invention and the improvements incorporated therein, aspired to providing the user of the play or instructional equipment with a complete impression of sitting in a power vehicle and controlling it by appropriate operation of naturalistic control and steering means, through the hazards of road traffic or over a race track or the like.

Accordingly, the equipment consists in its material outward characteristics of a boxlike casing enclosing the apparatus, one side being slightly sloped and formed as an instrument board provided with a steering wheel; the top being designed as a slightly sunken game board, enclosed by a border and made of non-magnetic material.

Further and materially exceeding the known state of the art, the instrument board is provided with an ignition lock for switching on mains current, a starter button to operate a neutral-running noise simulator and reversing a guiding or lead magnet below the board to a so-called starting place in, e.g., the left front side of the board, with a red idling and/or ignition signal lamp, an orange control lamp for the starter and the functions connected with its operation, with blinkers, blinker switches and a gear lever.

Further, also materially departing from the known state of the art, there is a pedal switchbox fitted with an accelerator, with clutch and brake pedals and connected over a cable with the equipment, the latter being appropriately placed on a table, while the pedal switchbox is on the floor under the table.

Inside the casing of the equipment and underneath the board, a lead magnet is arranged in a manner movable vertically and horizontally on guide rails. The magnet can be moved in the sense of both movement components and their combination, the diagonal resultant, by electric remote control operated by the steering wheel, the magnet imposing its motion on the miniature motor car above it and fitted with an iron core or the like.

Compared to the present state of the art the control system has the advantage that only one motor performs the respective horizontal or vertical movements of the lead magnet, that these motors, insofar as they are running simultaneously, have the same speed, thus move the lead magnet uniformly both vertically and horizontally, that is actually diagonally at 45°, and that all the features of the board, straight roads, curves, circles, diagonals etc. can be driven over by controlling with the steering wheel at will preferably only eight basic directions of motion or control positions. This reduces the technical effort to a minimum while retaining the full effect.

In this inventive arrangement the controls are designed and wired so that a motion of 90° to the left with the steering wheel causes the miniature motor car on the board to turn 90° left, a left turn of the wheel of 45° causes a 45° left turn on the board, a further left turn of the wheel turns the motor car further left, and so on. Contrarily, with a right turn of the wheel, the car turns right corresponding to the 45° and 90° steps, as the case may be. A concatenation of left and right turns of the wheel would produce a forward motion repeatedly turning left and right, i.e., in a serpentine.

If the turn of the steering wheel is varied left and right, first slightly, then more, i.e., once 45° and once 90°, the miniature motor car performs an irregular serpentine on the board with alternately smaller and larger left or right turns, respectively. In practice, moreover, a merely impulsive turn of the wheel to an adjacent index segment, as will be explained later, and immediate recovery of the wheel to the original position will produce only a brief turn of the miniature motor car from the original direction of drive, so that this produces the effect of falling into line or changing over to another lane.

Although all directions of drive are derived from only eight basic directions of motion of the lead magnet and/or eight corresponding steering-wheel positions, the above-described steering method provides a correct description or driving over of curves, arcs, obliques and straight lines. As the longitudinal and transverse motors can be made to run alone or together, either counterclockwise or clockwise, and the control for "on" and "off" and also the synchronized control and direction of running, clockwise or counterclockwise, of the two motors are controlled by a selector and reversing switch connected to the steering wheel in a definite order, the eight steering-wheel positions produce the following eight basic motions of the lead magnet: (1) Steering wheel centered (a mark on the wheel points upward)=motor car drives upward on the co-ordinate system of the game board; (2) steering wheel 45° to left=car drives left upward; (3) steering wheel 90° to left=car drives left; (4) steering wheel a further 45°, i.e., 135°, to left=car drives left downward; (5) steering wheel 180° to left (or, related to the centered position of the steering wheel, to the right)=car drives downward; (6) from this position a further 45° to left=car drives right downward; (7) 90° to left=car drives right; (8) a further 45°=car drives right upward, and, finally, further 45° (the steering wheel, having made a full turn and reached its centered position identified as (1) in the foregoing)=car drives again upward. With a full left turn of the steering wheel the vehicle has similarly described on the board a full circular route in anticlockwise direction, the regularity of the circle depending on the evenness of the turning movement on the steering wheel. Conversely, with a full right turn on the steering wheel the motor car would describe a clockwise circle.

As a further refinement of the equipment, a four-step gear-change lever is fitted on the steering column. Being guided in a H-shaped gate and associated with stepped electric switch plates, said gear-change lever allows neutral, low, intermediate, high and reverse gears to be shifted and imitated insofar as this reduces the driving voltage for the longitudinal and transverse motors in three steps, before the input into the switch plates operated by the steering wheel, and reverses polarity of, in the reverse position, respectively. The shift steps of, e.g., 0.0–1.5 v. in low gear, 1.5–3.0 v. in intermediate, and 3.0–4.5 v. in high gear can also be continuously varied within their ranges by a control resistor connected to an accelerator pedal, so that within the individual gear steps the effect of pressing the accelerator pedal can thus also be achieved.

Each gear position is blocked by a mobile iron core of a magnetic coil falling into a catch. By operating the clutch the said engagement is temporarily suspended, and the gear lever can only then be shifted to another step.

This means that gear shifts must be carried out as in a normal motor car. By the operation of the clutch the speed of the miniature car is made to slacken, as happens normally. This is done through the voltage drop in the leads to the longitudinal and transverse motors, caused by the magnetic coil.

Further the steering column is fitted with a direction-indicator switch, with which, on making left or right turns, blinkers or flashers placed left and right of the instrument board are operated over a bimetallic contact. The toggle switch for the blinkers is mechanically connected to the steering column so that, e.g., in flashing on the right, after a certain right turn of the steering wheel, the blinker is automatically returned to the neutral position; when the steering wheel is erroneously turned left when the blinker position is "right," the steering movement of the wheel is blocked to the left. The same occurs in the opposite direction of turn and/or flash. This has an educational effect in preventing incorrect signalling.

In accordance with known equipment and real conditions there is also a button, preferably on the hub of the steering wheel, to operate a signal horn inside the equipment. In accordance with the invention the signal horn, however, fulfills a further purpose: it simulates an idle-running sound. If the horn, consisting of a magnetic coil with a diaphragm, is fed with relatively low voltage, only a dull tone is heard, which is felt to be an idling sound. As the two motors for the longitudinal and transverse motions only emit a motor noise after the gears are shifted and the accelerator depressed, and this noise can be related by the user to the driving of the miniature motor car, the natural idling sound would be missed after operating the ignition. Thus on switching on the ignition key switch—practically, on switching on the mains—a relatively low voltage is fed to the horn, which gives rise to the above-mentioned idling sound. If the gear lever is shifted out of its neutral position, the idling or humming sound stops, and the longitudinal and/or the transverse motor is energized, according to the steering wheel positions. If the horn button is depressed during the idling sound, the circuit is switched over to full voltage and gives a normal horn signal.

The controls already mentioned for accelerating over a control resistor and clutching in gear shifting by disengaging an electrically operated locking device on the mechanical gear-shift controls are accommodated in a special pedal box, which is also fitted with a brake pedal. On depressing the brake pedal the driving voltage is cut out, so that the miniature car stops on the board. The clutch pedal is coupled mechanically with the brake pedal so that the brake pedal engages or locks in its lowest position unless the clutch pedal is also depressed at the same time, as is done in an ordinary motor car. This represents the condition of "stalling" in that the driving voltage can only be cut in again when, by depressing the clutch, the locking of the brake pedal is released. At the same time as the brake pedal engages—that is on incorrect braking without using the clutch—a contact in the brake box is operated which lights up a control lamp on the instrument board, which signals the "stalling" optically as happens in reality, a realistic feature enhancing the absence or cessation of the motor sound.

A special control enables the user to ascertain at anytime the position of the lead magnet below the board. This is by means of a light bulb fixed beside the lead magnet and shining through the transparent board as soon as the starter button on the instrument board is pressed only slightly. When the starter button is further depressed, which corresponds to a second switch position, an orange control lamp on the instrument board also lights up. In this switch position, contacts are also closed which put the longitudinal and transverse motors under operating voltage, poled so that the longitudinal motor moves the lead magnet downward and the transverse motor moves it to the left, so that the lead magnet at the end of its motion and/or of the starting process is at the starting point for driving the miniature motor car, at the bottom left corner of the board. In the starting position the lead magnet runner fitted with its light bulb strikes with a switch contact against a stop, which opens and turns out the light bulb. As against this a red control lamp lights up when the ignition is switched on with the ignition key, provided the gear lever is in neutral, which is the proper condition for correct starting of a vehicle. If the gear lever is put into a gear after the clutch is depressed, the red lamp goes off again.

An especial advantage of the invention is seen in the fact that all electric and mechanical controls in front of the instrument board are concentrated inside a casing of the steering column, and those behind the instrument board inside an extension of the steering column, which means that for the material part of the electro-mechanical control elements a closed component is formed, exceptions being the electro-mechanical control elements with pedal operation; these again are advantageously accommodated in a closed component—the pedal control box.

The first-named component—designated below as a steering-column control unit—contains, arranged at distances one behind the other, control and/or assembly plates, the first of which, e.g., counting from back to front, bears the signal-horn assembly and control elements; the second and third, the control segments and sliders for the steering-wheel-controlled longitudinal, transverse and diagonal motions of the lead magnet, including the control for the repoling of the motors; the fourth and fifth, the contacts for the electric stepwise shifting with the gear lever; and the sixth serves as an anchor plate for the components on the instrument board and also to hold the tension-rod coil for arresting the gear-shift steps and the blinker switch mechanism.

From the control-plate part fitted behind the instrument board there project forward, inside the steering rod casing, two superposed hollow shafts with a push rod therein; these shafts perform the individual power transmissions from the controls in front of the instrument board to the control elements behind it. The horn button in the middle of the steering wheel is connected to a push rod fitted in the center of the component and running to the horn control element so as to operate it.

The push rod is enclosed in the hollow shaft fixed to the steering wheel and engaging with the sliders of the two control plates for changing direction and operating the movement.

The last-named hollow shaft is enclosed in a further hollow shaft. Being rigidly connected with the gear lever this hollow shaft can be shifted along the inner hollow shaft and turned, and is connected alternately behind the instrument board to the sliders of the two shift plates for the gear changing operations.

If the gear lever, following the H-shaped gate on the steering column casing, in the neutral position on the forward shift slot, is in reverse and low gears, a projection on the back end of the hollow shaft engages in the slider of the one control plate, and when the gear lever is put into the rear gate slot for intermediate and high gears, in the slider of the other control plate. At the same time cams or the like elements close a contact to switch on the red control lamp, this is through the hollow shaft, insofar as it is in the neutral position. Between the fastening plate behind the instrument board and the control plate for the stepwise gear shifting, opposite the fastening plate, there are on the outer hollow shaft stop holes, spaced to correspond to the neutral path of the gear lever in the gate. The core of a connecting rod magnet engages in these holes when the clutch is released.

Finally there is a further shaft placed eccentrically and parallel to the hollow shaft system on the fastening plate, between the blinker switch and the switch elements for the two blinkers, these elements being behind the fastening plate. The hub of the blinker toggle switch has a hollow throat running in the axis of the switch and aligned to the hollow shaft system so as to allow space for movement of pins which are here connected to the steering-wheel hub, parallel to the hollow shaft system and rotating round it. This has the effect that when the blinker switch is turned on in one direction the steering wheel with its pins strikes against the hub of the blinker switch and one direction of rotation is thus blocked, and in the other direction of the steering wheel, after a certain degree of turn of the steering wheel, a pin engages in the throat and returns the blinker switch to the zero position.

The principle followed in designing the game board with roads and buildings and other features is, according to the invention, to give the user adequate variety in the course of the use of the inventive device and to provide naturalistic traffic conditions. On the game board which is fitted above the equipment box in a slightly sunken position, plans can be fitted made of translucent foils showing simply printed or drawn stretches of roads, but advantageously three-dimensionally embossed road stretches, whereby appropriate plastic expedient can represent, e.g., the pavements edging the roads and even the rows of houses can be raised. It is appropriate to put at the bottom left starting point of the board a pump station or garage, or for race track plans a starting and winning post. It is also appropriate to provide for the game in accordance with the invention different plans to vary the road lay-outs, so that the user can learn from ever new situations and from his endeavor always to master them. Finally the plans for placing on the board can be replaced by toy houses arranged at will to form streets as required.

In accordance with the invention toy houses designed for this purpose are roofed so that when placed in rows or at right angles they largely correspond to reality. This is achieved by giving the roofs both a saddle-shaped slope and a slope at the gable ends, which allows the house gable to be placed against the long side of another house. Thus an assortment of different types of houses for right and left-hand corners and others for placing in rows can be dispensed with.

Finally the invention aims at allowing the above-mentioned equipment or similar equipments to be used by two or several people at two or several places opposite or at an angle to, or beside each other. In an arrangement of two instrument boards opposite to each other on the equipment box, with their control systems, using the same game board for driving two (or several) miniature motor cars, two (or several) co-ordinate systems formed of guideways for moving the lead magnets, including the relevant electro-mechanical arrangement below the game board, are arranged above each other in such a way that one system is turned 180° with respect to the other in the horizontal plane.

If the operating positions are not opposed, but at right angles or beside each other, it will be appropriate also to have the superposed co-ordinate systems at only 90° to each other, or at no angle at all.

If so far the polarity of the lead magnets was immaterial, the game for two or several users requires a particular polarity of the, e.g., two lead magnets and also particularly poled magnet cores for the miniature motor car, so that each lead magnet only influences the miniature car associated with it so that the two lead magnets do not mutually attract. The lower lead magnet of one system is, e.g., arranged so that its south pole is up and its north pole down. The upper lead magnet—that of the other system—is poled in reverse to this. Here the north pole is up and the south pole down, so that when the two magnets slide past each other the two south poles are opposed. As now in one magnet the north pole and in the other the south pole points upward, it is imperative for one miniature car to have its magnet with the south pole pointing downward, and the other car with its north pole downward. This means that each lead magnet only influences one particular miniature car and the two lead magnets have no mutual influence. It is also possible to arrange the poles in the reverse way.

The iron or magnetic core in each miniature motor car belonging to the equipment is in accordance with the invention preferably placed in the forward third of the vehicle so as to be in contact with the game board, the front wheels not touching the board. The rear of the car is supported by the revolving rear wheels. This arrangement of wheels and magnet core in the equipment according to the invention provides complete freedom of drive in curves or arcs and in reverse.

In the drawings, exemplary illustrations of the inventive device appear as follows.

Figure 1:
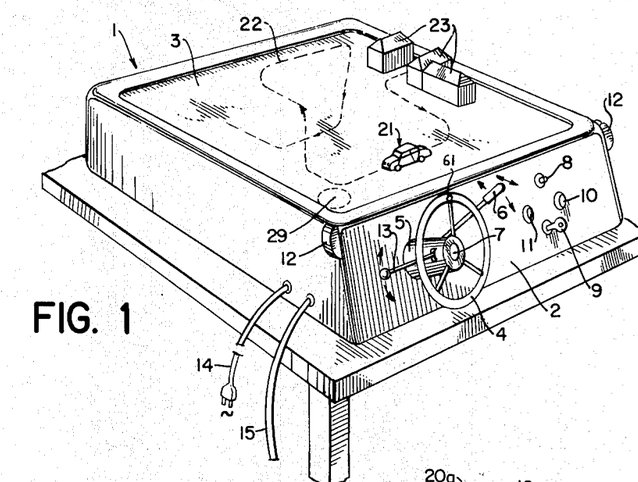
FIG. 1 is a perspective view of an equipment according to the present invention, placed on a table in a condition ready for use, and having one set of controls.

As shown in FIG. 1, the casing for the equipment is in the form of a box 1 whose upper surface—sunken so as to leave a raised edge all around—forms a game board 3 which is preferably made of transparent or translucent material. One side face of box 1 is slanted so as to provide an instrument board 2 fitted with a steering wheel 4, a steering column and/or its casing 5, a gear-shift lever 6, a signal-horn button 7, a starter button 8, an ignition key 9, control lamps 10 and 11, blinker lights 12, and a blinker switch 13. Current is fed from a mains lead 14 having a conventional plug at its end, and a multiple cable 15 connects the equipment with a pedal box 16.

The pedal box 16, in accordance with FIG. 2, appropriately set on the floor below the equipment 1, is provided with a clutch pedal 18, a brake pedal 19 and an accelerator pedal 20, which are joined to box 16 at one end and transmit their control movement by means of respective push rods 18a, 19a, 20a to the control elements inside. On the game board 3 of box 1 a zone 29 is marked; this marking is not present in the real equipment, but is intended to indicate the starting point at the beginning of the game for a miniature motor car 21. The starting point can, of course, just as well be at some other part of the board.

Numeral 22 on the playing space of board 3 shows an exemplary drive path made by the miniature motor car 21, which can be laid out in accordance with FIGS. 5 to 8 with miniature houses 23 or with inserted road plans. The controls of the equipment and instrument boards 2 can also be fitted on both sides of the box 1 as shown in FIG. 4.

Figure 4:
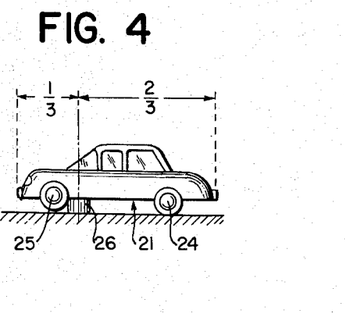
FIG. 4 is a side view of a miniature motor car designed for the equipment according to FIGS. 1 to 3.
Figure 5:
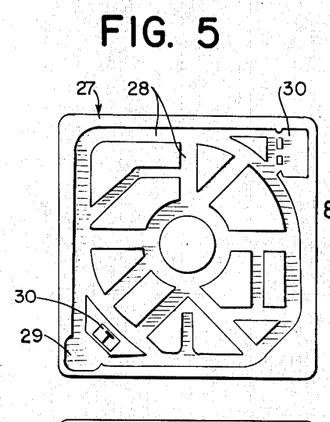
FIG. 5 is a plan view of a road plan for insertion into the inventive device, in particular, indicating a traffic circle.
Figure 6:
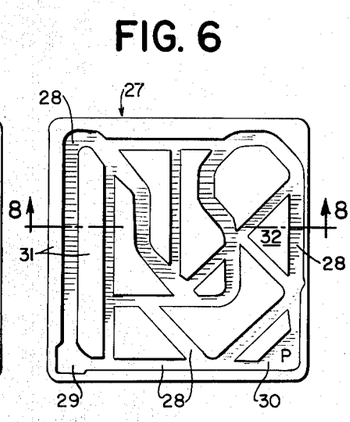
FIG. 6 is a road plan similar to that of FIG. 5, with a complex of mainly straight roads and an endless main street passing through this complex.
Figure 7:
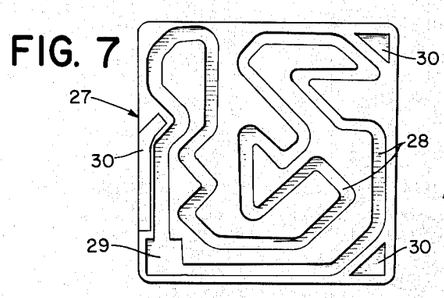
FIG. 7 is another plan for insertion, showing a race track with many curves and a starting and winning post.

The miniature car 21 shown to enlarged scale as FIG. 4 is specially fitted out to achieve an apparently naturalistic drive in the straight lines, curves, arcs or in reverse. In the forward third part there is an iron or magnetic core 26, which reacts to a lead magnet below the game board 3, to be described somewhat later in detail. So as not to influence this reaction, particularly in maneuvering with the steering, front wheels 25 are slightly raised so as not to touch board 3, while the iron or magnetic core lies on the board. Rear wheels 24 sit firmly on the board 3 as rear supports for the car 21, and turn appropriately as the car proceeds. The arrangement of the core 26 in the forward third of the car enhances the correctness of motion of the car, e.g., in driving over curves, and also ensures proper reverse motion without the car turning around its vertical middle axis.

For filling out the game board 3 with roads or the like various means can be employed in accordance with the invention. Very advantageous is the use of plans cut to measure as in FIGS. 5 to 7. These plans can be laid on the game board 3 and secured against slipping by the raised edges of the board. The plans preferably consist of a thin, non-warping, non-stretching, transparent or translucent plastic foil 27, printed with stretches of road or race tracks 28, and with parking lots, garages, gas stations, racing car boxes, or even seating for spectators 30, also with starting places 29 for the miniature car; in race tracks these places can be both starting and finishing points. The places 29 coincide with the zone 29 indicated in FIG. 1. Instead of the printed garages, gas stations and the like, corresponding miniature buildings can be set up. The road plans can of course consist of any other suitable material.

Figure 8:
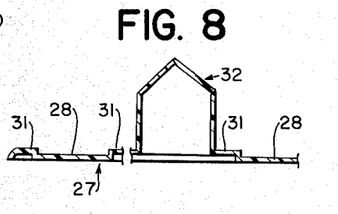
FIG. 8 is a somewhat schematic sectional view according to the line 8—8 of FIG. 6, illustrating the plastic formation of the road insertion plan to enlarged scale, not flat printed but with sunken roads, raised pavements and, where appropriate, also with houses raised from the foil material.
Figure 9:
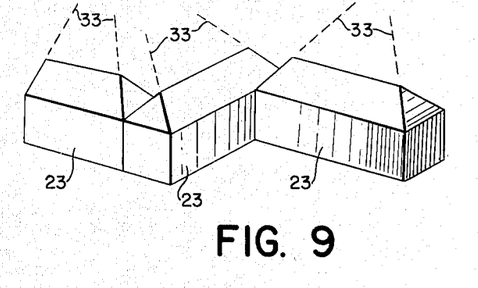
FIG. 9 shows in a perspective view houses arrangeable at will for the game board and for making stretches of road and/or corners.

In another advantageous design plans may be used made of plastic foils in which, e.g., by means of vacuum drawing the roads 28 and pavements 31 are plastically formed in relief as in FIG. 8. At the same time it is possible to form in relief entire rows of houses or complexes of houses as shown at 32 in FIG. 8. Finally, leaving out any plans in accordance with FIGS. 5 to 7, which merely indicate a few examples of all possible roads, streets can also be set up at the will of the user with the miniature houses 23 shown in FIGS. 1 and 9. To allow uniformly good joints of such houses in a row or at right angles to each other gable ends 33 of the roofs are also formed saddlewise.

A mechanical system of co-ordinates, known per se but structurally simplified is fitted below the game board 3 in accordance with FIG. 10 so that a runner or slide 43, equipped with a guiding or lead magnet 43a, can be moved at any point of this system. This is made possible by horizontal and vertical guideways, the terms horizontal and vertical being related to the co-ordinate system. Horizontal movement (see arrows "c" and "d") is carried out by means of guide rods 40a which at one end terminate in a horizontal U-shaped guide piece 41 and at the other in a vertical guide piece 42 which is open at the bottom.

On the guide piece 42 a motor 37 with a reduction gear 36 is disposed, which motor effectuates the horizontal movement of the runner 43 over pulleys 39 and a cord 39a as soon as the motor is switched on; according to polarity this movement is either in direction "c" or in direction "d."

The system described for the directions "c"–"d" rests in the co-ordinate system with its guide pieces 41 and 42 on two vertically disposed guide rods 40 and is thus movable vertically (see arrows "a" and "b"). This is done by engagement of a further cord 38a running vertically over pulleys 38, this cord being moved by a further motor 35 with another gear 36 as soon as this motor is switched on; this movement is either in direction "a" or "b" according to its polarity. The guide pieces 41 and 42, being constructed free of swing or cant, combine with the guide rods 40 to allow perfect, non-jerking movement of the horizontal movement system in the vertical, although the cord 38a engages only unilaterally at 36 and not bilaterally at 36 and 41.

For remote control of the horizontal, vertical and diagonal movements of the runner 43 the invention makes use of a particularly simple control switch 44, 45 (see FIG. 11), coupled with the steering wheel 4 and/or of a particularly simple control circuit (see pairs of wires a and b, c and d). The control switch consists of two levels formed by switch plates 44, 45, whose sliders in FIG. 1 standing on the two segments a—a connected synchronously over a steering wheel axis or hollow shaft 5a with the steering wheel 4. The steering wheel is provided at one point with a zero marking 61. If this is centered as in FIG. 11, the sliders are in the example given here on segments a of the switch plates 44, 45. The switch plates each have four segments a to d, of which the identically designated segment pairs always correspond to a direction of arrows "a–b" and arrow "c–d" in FIG. 10. The pairs of wires connecting switch plates 44, 45 with motors 35, 37 are designated in accordance with the directions of movement and/or segments, so that it can be seen by the segments and the pairs of wires as a whole in what direction they will move the runner 43 when the equipment is started up. Thus, for instance, wires a are correlated with a segment zone a, to be described hereafter, for displacing slide 43 (and magnet 43a) in direction "a." It should be noted that motor 37 is reciprocated together with slide 43; its supply leads 17 (connected to wires c and d of FIG. 11) are made of a flexible and/or coiled wire, as schematically shown in FIG. 10.

Figures 11, 12, 13, 14, 15:
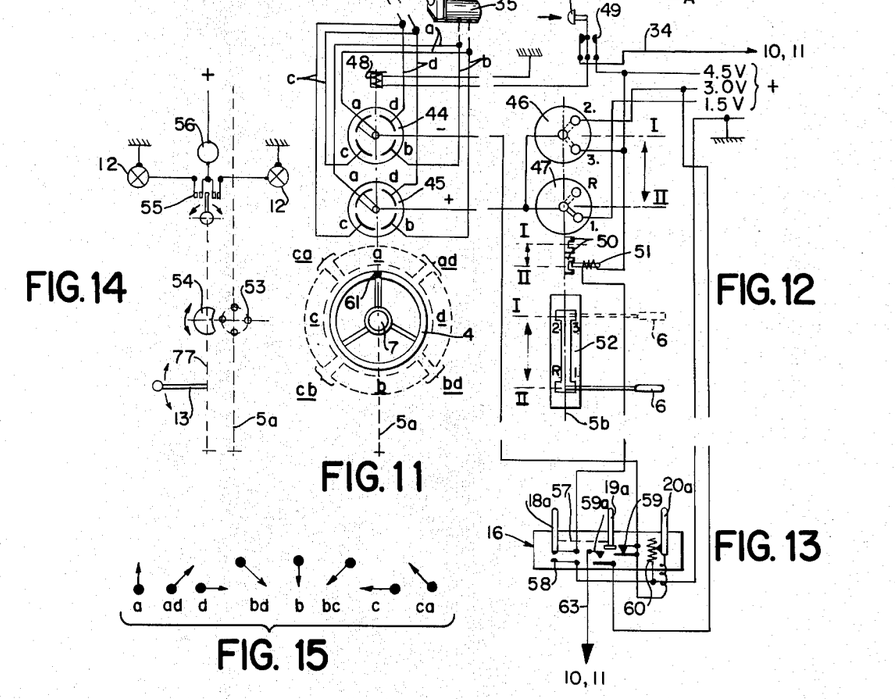
FIG. 11 is a partial diagram of the electrical control system for the remote control, connected with the steering wheel operating this part.
FIG. 12 is another partial diagram of the electrical control system for switching the gears, connected with the gear lever operating this part.
FIG. 13 is again a partial diagram for clutch, brake and accelerator, connected with the appropriate pedals and accommodated in the pedal switch box.
FIG. 14 is yet a partial electrical diagram for operating the blinkers or flashers, connected with the blinker switch operating this part and with the blocking or recovery control device operated temporarily by the steering wheel.
FIG. 15 is a vector scheme showing eight different controllable directions of movement of the magnet.

In the same way the steering wheel 4 is surrounded by segment-shaped zones designated (in clockwise sequence, as shown in FIG. 11) a–ad–d–bd–b–cb–c–ca, which however do not exist in the real equipment, so that from the position of the marking 61 on the steering wheel 4 alone, the actual direction of movement of the runner can be seen, and what steering wheel position must be adopted to control electrically the desired movements at any time.

If the steering wheel stands with its marking 61 in imaginary zone a, the sliders of switch plates 44, 45, of which one is connected positively and the other negatively to the equipment supply circuit, make a connection to the two segments a and, over the pair of wires a switch on the motor 35 with counterclockwise polarity.

If the steering wheel is turned to b, polarity is reversed over the pair of wires b, so that the motor 35 runs clockwise and the runner 43 with its horizontal guide system moves in direction "b," whereas with the above anticlockwise polarity the movement of the runner was in direction "a."

In turning the steering wheel to zone c, the sliders of the switch plates turn on the motor 37 to run anticlockwise, changing thereby the movement of the runner 43 to direction "c," or when the steering wheel is turned to zone "d," to direction "d." If the pair of sliders of the switch plates 44, 45 bridges two adjacent segments of the switch plates, both motors are moved in the direction of turn shown in each case by the lettering a to d, and/or the runner 43 is moved diagonally in the direction resulting from the two motion components "a" or "b" and "c" or "d."

Figure 10:
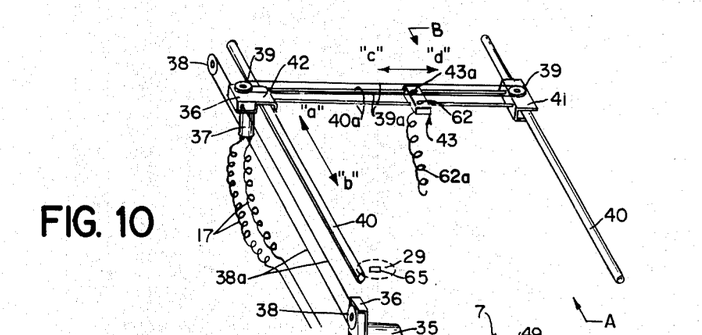
FIG 10 is a perspective view of the structure of a mechanical co-ordinate system for moving a guiding or lead magnet.

In the vector diagram of FIG. 15 the eight possible directions of movement are represented and marked, to correspond with FIGS. 10 and 11, from a to d and with the intermediate diagonal steps ad, bd, etc. In its starting position the runner 43 is guided into the theoretical zone 29 (see FIGS. 1 and 10), which also corresponds to the starting places 29 in FIGS. 5 to 7 and may, of course, also be positioned at some other place on the game board 3.

For shifting gears, the gear lever 6 is, in accordance with the invention, movable in a gate 52, the lever 6 being operated in low and reverse gears on a forward level marked II, in intermediate and high gears on a rear level marked I—exactly as in the known way of shifting gears in a power vehicle. Over a second hollow control shaft 5b rigidly connected to the gear lever 6, rotatable and longitudinally movable, the control motions are transmitted to two further switch plates 46, 47 whose four control contacts, which in accordance with the gear gate 52 are marked 1., 2., 3., (first or low, second or intermediate, and third or high speeds, respectively) and R (reverse), lie, e.g., in third (high) gear at +4.5 v., in second gear at +3.0 v., and in first (low) gear at +1.5 v. of the supply circuit. The sliders of the switch plates 46, 47 are operated alternately by the control shaft 5b, namely that of switch plate 47 when gear lever 6 is put into level II and that of switch plate 46 when the gear lever 6 is put into level I.

Each level has two shift positions and between these a neutral position. Both sliders are connected electrically to each other and to the switch plate 45 of FIG. 11. If the gear lever 6 is shifted to 1. in level II, 1.5 volts are fed over contact 1. of switch plate 47 to the control system 44, 45, such shift position being drawn in exemplarily in FIG. 12, while the other three shift positions are merely indicated on the switch plates 46, 47 by the sliders being drawn in broken lines. If the gear lever 6 is moved from level II to level I, the slider of switch plate 46 engages, so that when gear lever 6 is put left or right 3.0 or 4.5 volts are fed to the control system 44, 45 over contacts 2. or 3. of switch plate 46. In this way the control system is fed, in accordance with FIG. 11, with various voltages, which affects the runner 43 in FIG. 10 so as to allow it to be moved first more slowly, then more quickly;

consequently the miniature car in FIG. 1 drives first more slowly, then more quickly.

The contact R for reversing, on switch plate 47 in FIG. 12, when actuated reverses the polarity of the two positive and negative wires leading to the sliders of the switch plates 44, 45, imitating a control movement not illustrated here, but being indicated schematically by contact R in switch plate 47. The R shift reverses the runner 43 in the direction of movement it has just taken.

Figure 2:
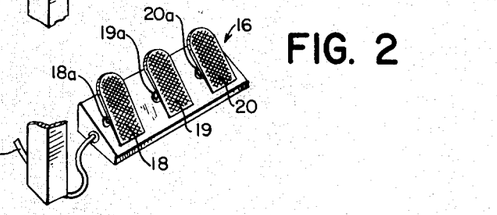
FIG. 2 is a perspective view of the pedal box belonging to this equipment, connected to the device shown in FIG. 1.

The pedal box as shown in FIGS. 2 and 13 influences the control circuit in FIGS. 11 and 12 and the co-ordinate system of FIG. 10 as follows. If the accelerator pedal 20 with its push rod 20a is depressed against a spring (not shown), a control resistor 60, which at full insertion absorbs 1.5 volts, is rendered ineffective, so that the control system of FIG. 11 receives, by way of the gear control system of FIG. 12, the full voltage controlled by gear lever 6 (1.5/3.0 or 4.5 v.). If the accelerator pedal 20 is allowed to return, the voltage drops gradually and continuously to 1.5 volts.

If the accelerator pedal 20 is not operated, the full resistance of control resistor 60 is therefore switched on and the driving voltages fed to the control system in FIG. 11 are still only 0 v. in first gear, 1.5 v. in second, and 3.0 v. in third. With depression of the accelerator pedal they can each be "brought up" gradually by 1.5 volts, so that in each of the gears there is again full voltage, giving the effect of accelerating or "giving gas" in a real motor car, in the miniature car 21 (FIG. 1).

If the brake pedal 19 is operated, the current supply is cut off over a contact 59 by way of push rod 19a, and the miniature motor car comes to a stop. This gives the effect of braking. If the clutch pedal 18 is not depressed at the same time, a mechanical catch or locking device, known per se and here merely indicated by an interconnecting broken line 57, ensures that the brake-pedal push rod 19a locks in its lowest position. This interrupts the current supply, which imitates the effect of "stalling."

If the clutch pedal 18 is subsequently depressed the catch 57 is again released via the push rod 18a and contact 59 cut in again. The clutch pedal fulfills a further purpose, however. It operates a contact 58 which closes when the pedal 18 is depressed and energizes a solenoid which in turn operates a tie rod 51 disposed in the gear-shifting system of FIG. 12. In its position of rest the tie rod 51 engages in one of two stop holes 50, disposed at levels I and II on the gear shaft 5b, and arrests the gear shaft 5b. If the clutch pedal 18 is operated the tie rod, however, releases the stop holes lying opposite to it, so that the gears can now be shifted. This produces the naturalistic effect of having to operate the clutch when changing gears.

The blinkers 12 in FIGS. 1 and 14 are operated electromechanically by a switch lever or toggle 13 connected over a control shaft 77 with a reversing switch 55, and by a bimetallic element 56. The switch 55 puts one of the blinker lights 12 under current over a bimetallic element. However, a particular arrangement exists in that the control shaft 77 and the steering wheel shaft 5a influence each other. If the control shaft is in the position of rest, a cylinder 54 disposed on and following the control shaft, and grooved on one side, adopts a position such that a ring of pins 53 disposed rigidly behind the hub of the steering wheel 4 and surrounding it can turn easily past the groove of the cylinder 54.

If the switch 77, 55 is put to blink on the right and the steering wheel is turned to the right, a pin of the arrangement 53 runs after a certain degree of rotation against the groove of cylinder 54, now in the path, and thus presses control shaft 77 back to the position of rest. If, however, with blinking on the right the wheel is turned to the left, one of the pins runs against the covering surface of cylinder 54, blocking steering wheel rotation if it does not agree with the particular blinker. The procedure is the same in the other direction.

Figure 16:
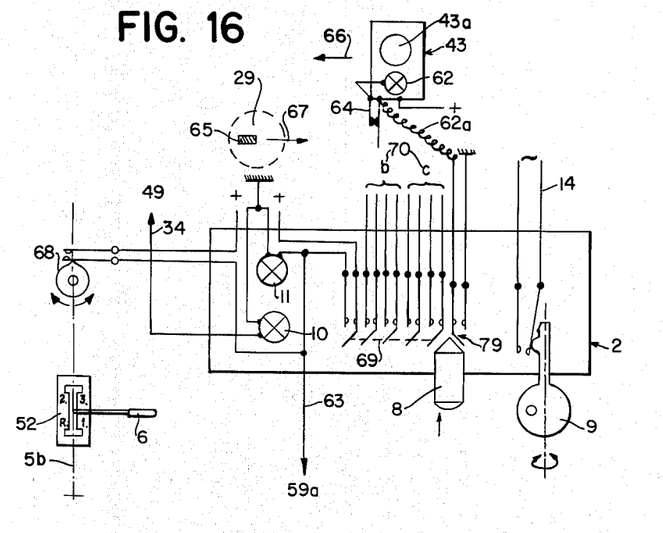
FIG. 16 is yet another partial diagram of the electrical control system, completing those of FIGS. 11–14, affecting the elements for switching on, starting, and controlling the equipment and the reproduction of the switching on and off of the movable light bulb accompanying the lead magnet under the game board, in connection with the controls.

Special control means and circuits in accordance with the invention and shown in FIG. 16 carry out the other functions as in a real power vehicle. With an ignition lock placed in the instrument board and the ignition key 9, the mains are switched on by closing a contact. It will be understood that one terminal of this contact is common with the mains lead 14 while the other leads to a mains supply circuit not shown in detail. In a conventional manner, all voltages needed for the operation of the amusement device are derived from such a supply circuit in a manner known per se. At the same time the red ignition control lamp 10 lights up, which is connected directly to the equipment supply, e.g., to the secondary of a mains transformer. Over a lead 34 leading from lamp 10 to a horn switch 49 of FIG. 12, a signal horn 48 in FIG. 11 is also fed continuously with low current of, e.g., 1.5 v., so that a humming sound imitating idle running is heard. This enables the horn to be used both for signalling and for simulating the idling sound. The lead for control lamp 10 passes over a contact (see FIG. 16) operated by a cam 68. The latter is connected with the gear shaft 5b and set so that the contact is closed in the neutral position of the gear lever 6, but open in all other gear-lever positions. As soon as a gear is shifted the control lamp 10 goes off, which again with simultaneous depression of the accelerator pedal corresponds to reality.

If the starter button 8 is depressed only slightly, it connects, via contact 79, a lamp 62 disposed on the runner 43, this operation being performed over a coiled or flexible wire 62a leading to the runner 43; as against this, when the button 8 is pressed through to a stop, further contacts 69 are operated. By switching on lamp 62 the position of runner 43, which is invisible below the game board 3, can at any time be ascertained, as the lamp 62 shines through the transparent board 3 and through one of the foils 27 (see FIGS. 5 to 7). The contacts 69 connected at the outlet side lead over pairs of wires 70—i.e., c and b of FIGS. 11 and 16—to the c and b connections of the motors 35, 37 (FIG. 10), supplying current, providing motor 35 with clockwise running for direction "b" of the runner and motor 37 also with clockwise running for direction "c" of the runner, without current being supplied over the gear-shift system, the lever 6 of which is in neutral. The runner 43 is thus brought back to its starting position in zone 29 (FIGS. 1, 10 and 16) when starter 8 is depressed fully.

When the runner or slide 43 has reached this position, a control contact 64 on runner 43 runs against a stop 65— as explained by arrows 66 and 67 in FIG. 16—and switches off lamp 62, since the control function as to the position of the runner is no longer required. Further, when the pairs of wires 70 are cut in, the control lamp 11 on the instrument board is switched on. This shines for the duration of movement of the runner 43 to the starting point 34, as when the movement is completed the starter is again released and control lamp 11 switched off.

Control lamps 10, 11 (FIG. 16) are further connected with the pedal box 16 in FIG. 13 by a lead 63. With this lead, a control contact 59a of FIG. 13 is connected, which is closed as soon as the brake pedal 19 is operated in "incorrect driving" without depressing the clutch pedal 18, and in the lowest position of the brake pedal 19 locks with the mechanical coupling or catch 57. This ensures that when the "motor" is "stalled" the control lamps 10, 11 on the instrument board 2 light up.

Figure 17:
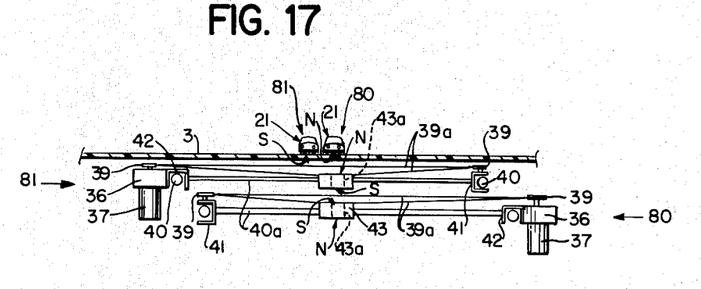
FIG. 17 shows in a side elevation two mechanical co-ordinate systems for moving two lead magnets, as shown in FIG. 10 as per arrows *a* and *b*, the arrangement enabling two cars to be controlled on the same game board without mutual influence.

With two superposed co-ordinate systems, generally identified as 80, 81, in accordance with FIG. 10, as shown in FIG. 17, looking in the direction of the arrows "a" and "b" of FIG. 10, a definite polarity of the magnets 43a is necessary, which when only one system is being used is of no significance. To prevent mutual attraction, polarities are in FIG. 17 from below upwards in accordance with the following scheme: in the lower magnet of system 80, N–S, in the upper, belonging to system 81, S–N. The sequence of poles can also be in the reverse direction.

In order that only one miniature car 21 can be influenced by one magnet 43a, one car is fitted with a magnet in superposed polarity N–S and the other car with a magnet in superposed polarity S–N, as indicated by numerals 80, 81, correlating them to the appropriate co-ordinate systems. In the car 21, pertaining to system 80, therefore, the north pole, in the other car 21 in FIG. 17, pertaining to system 81, the south pole, points downward.

In the example shown the two respective co-ordinate systems 80, 81 are turned 180° to each other in the horizontal plane. Thus the motor 37 of one system is on one side of the equipment and the motor 37 of the other system on the other side. With this arrangement the two systems can be somewhat staggered in relation to each other, so that the guiding parts—especially 40 to 42—can pass each other better, keeping in mind the fact that an effort is made to dispose both or several superposed systems as near as possible to the game board 3.

The same effort persists where the systems, super- or sub-posed, are not turned from each other at all or are turned, e.g., only by 90°. According to the different distances of the lead magnets 43a from the miniature cars 21, the fields of the magnets 43a are adjusted. The magnets disposed in the cars 21 are given relatively small fields, so that the magnetic influence of the cars on each other—which, however, is one of the repulsion only—is as small as possible, though the effect of reality is achieved on that if they collide the cars bounce away.

The electro mechanical control elements in FIGS. 11, 12, 14 and in some cases also in FIG. 16 are, according to the invention, accommodated together in a steering column switch system. This means that one closed component, simple to make, easy to assemble and to wire is there for all corresponding control and operational functions or controls manipulated from the instrument board. Included in this component, the switch plates 44, 45, 46 and 47 are disposed in the manner of a built-up rotary switch at distances behind each other on a common central shaft, which at one end terminates in an end plate 73 bearing the signal horn 48 and at the other in a fastening and bearing plate 74 behind the instrument board 2 to accommodate the tension rod magnets 51 and the blinker switch arrangement 55, 56, 75 and 77.

Figure 18:
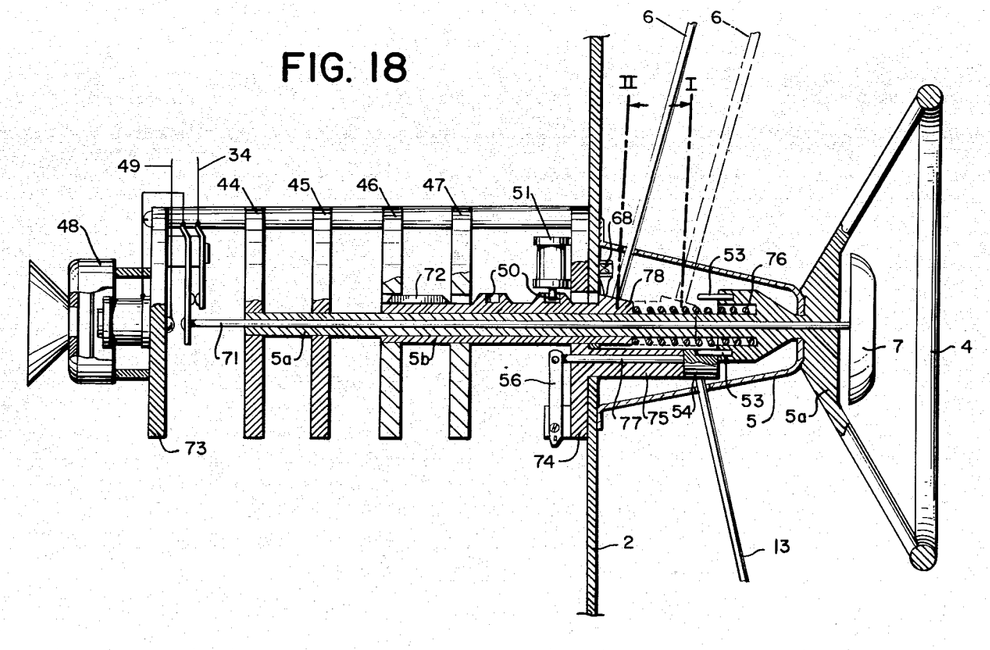
FIG. 18 is a longitudinal section through the steering-column switch with steering wheel, gear lever, blinker switch and signal horn.

In the longitudinal central shaft of the set of switch plates and end plates runs a push rod 71 from the signal horn button 7 to the signal horn reversing switch 49, with which the horn 48 can be switched over from the relatively low permanent operating voltage to the higher voltage. The push rod 71 partly surrounds the hollow shaft 5a which at one end is connected firmly with the steering wheel 4 and lower down engages in the sliders, not particularly shown here, of the switch plates 44, 45, which means that when the steering wheel is turned the two sliders can be turned. The hollow shaft 5a is enclosed in the further hollow shaft 5b which at one end is connected under spring pressure 76 and over an oblique projection 78 with the gear lever 6, and at the other end engages alternately in the sliders of the switch plates 46, 47, not particularly shown here.

Corresponding to the two control levels I–II on the gear lever 6, alternatively and by means of a projection 72 fitted rigidly to the hollow shaft 5b, the sliders of switch plates 46 and 47 are driven. Above the projection 78, contact 68 (see FIG. 16) can be disposed which is closed in the neutral position of the gear lever 6 and switches on control lamp 10. The hollow shaft 5b is provided with stop holes 50, in which the core of the tension-rod magnet 51 engages in the arrest position—that is after shifting of a gear—the distance between the holes corresponds to the distance between the gear-shift levels II–I.

Behind the hub of the steering wheel 4 the ring of pins 53 is disposed on a tubular extension. This ring of pins, when the steering wheel is turned, slides past a groove in the cylinder 54—the nodal piece for the blinker switch and the blinker switch shaft 77. When the cylinder is turned by moving the blinker switch 13 to operate contact 55 and the bimetallic element 56, one of the pins 53 always strikes the groove or the jacket of the cylinder 53, according to the direction of turn on the steering wheel, whereby either the steering wheel is locked to prevent turning, or the blinker switch is returned to the position of rest. The blinker switch shaft 77 can be led into the sleeve 75 attached to the plate 74. The part of the steering column switch system before the instrument board 2 is covered by the steering column casing 5 (see also FIG. 1). In this casing 5 there are slots for the two levers 6, 13. The slot for gear lever 6 is formed by the gear-change gate 52, shown in FIGS. 12 and 16, but not shown in here.

Figure 3:
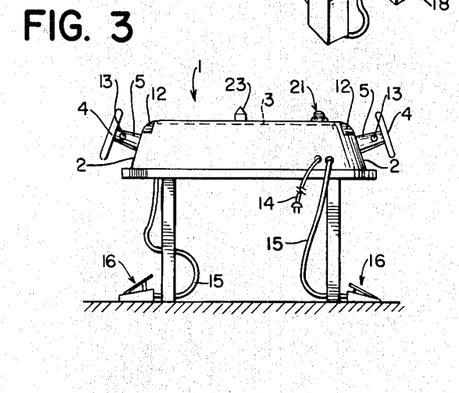
FIG. 3 shows a side view of an equipment as in FIGS. 1 and 2, but with two instrument boards and two sets of controls.

The details described and included in the drawings show the course of the game or use of the equipment as follows:

(1) Connect mains lead 14;
(2) Centersteering wheel 4, so that mark 61 points upward and/or in accordance with the co-ordinate system direction "a";
(3) Put gear lever 6 in neutral;
(4) Switch on ignition 9; red control lamp 10 burns, horn 48 hums (idling sound);
(5) Press starter button 8; both control lamps 10, 11 burn, runner 43 moves, its control lamp 62 lighting up simultaneously, to starting point 29; on its arrival there lamp 62 goes out and starter buttons 8 is released, switching off orange control lamp 11 and leaving on red control lamp 10; idling sound continues;
(6) Step on clutch pedal 18, releasing gear-change system, and put gear lever 6 into first (low) gear, thus switching off the red control lamp 10 and the idling sound;
(7) Release clutch pedal 18 and depress accelerator pedal 20, whereupon the miniature motor car 21 on the game board 3 starts moving in the "a" direction set by the steering wheel 4, and can be changed in its direction by altering the position of the steering wheel;
(8) Shift other gears by using clutch, decelerating and accelerating as described above;
(9) Brake as soon as the "traffic" calls for it, by depressing brake pedal 19, both control lamps 10, 11 lighting up unless the clutch 18 is depressed at the same time—the car being "stalled," but the possibility remaining of correcting this "incorrect operation" subsequently by operating the clutch 18; and
(10) Operate blinker switch 13 as soon as it is intended to turn off left or right, i.e., when the steering wheel 4 is to be turned left or right.
(11) If during use of the equipment the position of lead magnet 43a is to be ascertained, depress starter 8 slightly whereupon control lamp 62 on the lead magnet 43a lights up below the game board 3.

With the above-described, naturalistic, electro-mechanical control system and its operation all possible driving maneuver can be performed which are adapted to the street plans laid on the game board or to the streets formed by erecting miniature houses, and also according to fancy without the use of any type of road indication. The equipment serves young and old as entertainment or as a means to learning the operation and maneuvering of a power vehicle. It can therefore be used with great advantage in driving schools and the like.

The technical construction is not restricted to the means described here, which are mostly merely designed as examples, but can be carried out in other suitable ways to achieve the same purpose, retaining the same principle of control and operation, without departing from the scope of the invention.

Thus it is also particularly possible to supply the equipment with mains current over a known transformer-rectifier circuit or even to use battery power, and also to lay out the equipment for other voltages and/or voltage stages than the 1.5 to 4.5 v. stages described.

The main components of the invention are materially the steering column switch system and the pedal box; these elements of the equipment combine in themselves naturalistically all control functions, including the simplified principle of the remote control of the co-ordinate system with its controllable return of the runner to a starting point the naturalistic arrangement and ways of operation of all switches and controls on the instrument board and on the pedal box, the control of the blinker system as such in such games, and the secondary functions of the same, the arrangement of the parts for mobility and influencing on the miniature motor car, the arrangement of streets and the like by particular, various and interchangeable means, and finally the possibility of using two or several co-ordinate systems at the same time in the same board.

To complete the limitation of a real dash-board the instrument board—which is neither illustrated in detail nor particularly described here—can be provided with an imitation speedometer, either painted or stuck on, and this again can be augmented by adding further imitations of the usual indicator dials. In the same way it is possible in accordance with the invention, to provide a glove compartment in the instrument board.

I claim:

1. An electro-magnetic instructional and amusement device comprising, in combination, a game board, at least two miniature automobiles placed on said board and each freely displaceable thereabove, at least two independent magnetic means each freely displaceable under said board, at least two mechanical co-ordinate systems for supporting and displacing respective ones of said magnetic means, magnetic responsive means rigid with said automobiles and reacting each to one magnetic means only, and a first as well as at least one second electric control means for displacing respective magnetic means and respective automobiles therewith from a first and at least one similar second centralized operating position, basically in two perpendicular directions and in intermediate directions derived as a combination of said perpendicular directions, each of said co-ordinate systems extending substantially under the entire surface of said board, said electric control means including switch means and reversing means for freely and independently displacing each of said magnetic means and the respective ones of said automobiles therewith substantially coextensively with said surface of the board.

2. An electro-magnetic device as defined in claim 1, wherein the main axes of at least one co-ordinate system are angularly displaced with respect to the other co-ordinate systems.

3. An electro-magnetic device as defined in claim 1, wherein one magnetic means faces said board with its S pole while the other magnetic means faces said board with its N pole, said responsive means being poled so that the respective one has its N pole facing said board and said S pole of the first-named magnetic means while the other has its S pole facing said board and said N pole of the second-named magnetic means, so that the opposing relationship prevents interference between the operation of said co-ordinate systems.

4. An electro-magnetic device as defined in claim 1, wherein said co-ordinate systems are supported at different distances from said board, the co-ordinate system closest to said board having magnetic means which has a weaker field than those of the magnetic means of the other co-ordinate systems which are farther away from said board, the fields of said responsive means being substantially equal among themselves but weaker than those of said magnetic means.

5. An electro-magnetic device as defined in claim 1, wherein each co-ordinate system includes two electric motors of substantially identical speeds, one each for moving the associated magnetic means in a respective one of said perpendicular directions, and wherein each control means includes switch means for selective energization of one motor, the other motor, and both motors of the respective co-ordinate system, said switch means including at least two switch plates selectively operable for said energization of the motors, and wherein each control means further includes reversing means for supplying selective current polarities to the energized motors, whereby said automobiles may be moved on said board in any one of at least eight distinct radial directions obtained from said perpendicular and said intermediate directions as well as the reversals thereof.

6. An electro-magnetic instructional and amusement device comprising, in combination, a game board, at least two miniature automobiles placed on said board and freely displaceable thereabove, at least two independent magnetic means freely displaceable under said board, at least two mechanical co-ordinate systems for supporting and displacing respective ones of said magnetic means, magnetic responsive means rigid with said automobiles and reacting each to one magnetic means only, first control means for displacing one magnetic means and one automobile therewith, from a centralized first operating position, basically in two perpendicular directions and in intermediate directions derived as a combination of said perpendicular directions, and at least one second control means for displacing at least one other magnetic means and one other automobile therewith, from a centralized second operating position, in said perpendicular and said intermediate directions, each co-ordinate system including two electric motors of substantially identical speeds, one each for moving the associated magnetic means in a respective one of said perpendicular directions, wherein each control means includes switch means for selective energization of one motor, the other motor, and both motors of the respective co-ordinate system, and further includes reversing means for supplying selective current polarities to the energized motors so as to move said automobiles on said board in any one of at least eight distinct radial directions obtained from said perpendicular and said intermediate directions as well as the reversals thereof, and wherein each operating position includes a steering wheel connected with said control means, as well as gear-shift means having at least two levels and at least two shift positions in each level, further comprising electrical lead means connectable to an extraneous source of current, and supply circuit means for feeding said motors with direct current and having at least two outputs of different voltage strengths, at least two of said shift positions allowing respective ones of said voltage outputs to be supplied to said control means, said reversing means permitting the polarities of said voltage outputs to be reversed when said gear-shift means is in an additional one of said shift positions.

7. An electro-magnetic device as defined in claim 6, wherein the main axes of at least one co-ordinate system are angularly displaced with respect to the other co-ordinate systems.

8. An electro-magnetic device as defined in claim 6, wherein one magnetic means faces said board with its S pole while the other magnetic means faces said board with its N pole, said responsive means being poled so that the respective one has its N pole facing said board and said S pole of the first-named magnetic means while the other has its S pole facing said board and said N pole of the second-named magnetic means, so that the opposing relationship prevents interference between the operation of said co-ordinate systems.

9. An electro-magnetic device as defined in claim 6, wherein said co-ordinate systems are supported at different distances from said board, the co-ordinate system closest to said board having magnetic means which has a weaker field than those of the magnetic means of the other co-ordinate systems which are farther away from said board, the fields of said responsive means being substantially equal among themselves but weaker than those of said magnetic means.

10. An electro-magnetic device as defined in claim 6, wherein each operating position further includes a pair of blinker lights, blinker switch means for selecting one of said blinker lights and energizing the same with interrupted current, and a direction indicator lever for selective operation of said blinker switch means, and wherein each control means includes blocking and releasing means associated with said steering wheel and with said blinker switch means, for blocking the movement of said steering wheel in one direction, when said blinker switch means has previously been actuated by said direction indicator lever in the opposite direction, and conversely releasing said blinker switch means if it has previously been actuated in one direction, when said steering wheel is subsequently turned in the same direction.

11. An electro-magnetic device as defined in claim 6, wherein each operating position further includes an ignition switch for selectively connecting said current supply means, a starter switch, and at least one signal lamp, wherein said board has a predetermined starting position for each automobile, and wherein each control means includes starting switch means controlled in one operated position of said starter switch, for moving the associated automobile to said starting position, said signal lamps indicating the operation of said starting switch means.

12. An electro-magnetic device as defined in claim 11, wherein each co-ordinate system has carriage means reciprocable in one direction and slide means reciprocable on said carriage means in a perpendicular direction, and a position lamp attached to said slide means and connected in series with a stop switch on said slide means, current supply to said position lamp being established in another operated position of said starter switch and interrupted when said stop switch hits against a stationary stop attached adjacent said starting position.

13. An electro-magnetic device as defined in claim 6, wherein each control means includes a unitary switch structure at the respective operating position, said switch structure including at least two switch plates forming part of said switch means, an inner shaft member operatively connected to said steering wheel for operating at least one of said switch plates which selects the appropriate one of said radial directions, an outer hollow shaft member operatively connected to said gear-shift means for operating another at least one of said switch plates which selects the appropriate one of said shift positions, said shaft members together forming a steering column for said steering wheel, and stationary end plates between which stationary and movable contacts of said switch plates are arranged.

14. An electro-magnetic device as defined in claim 13, wherein said inner shaft member is hollow, said switch structure further including a push rod reciprocably arranged within said inner shaft member and said outer shaft member surrounding the latter, a horn button on the forward end of said push rod, and a throw-over switch operated by a rear portion of said push rod beyond the rear end of said inner shaft member, for energizing an electric horn forming part of said operating position.

15. An electro-magnetic device as defined in claim 13, wherein said switch structure further includes no-load switch means acted upon by a peripheral portion of said outer shaft member, each operating position including an indicator lamp which is energized by way of said no-load switch means only when said gear-shift means is in a neutral position intermediate said shift positions.

16. An electro-magnetic device as defined in claim 13, wherein each operating position further includes a pair of blinker lights, said switch structure further including blinker switch means for selecting one of said blinker lights and energizing the same with interrupted current, and a direction indicator lever in the region of said steering wheel for selective operation of said blinker switch means.

17. An electro-magnetic device as defined in claim 16, wherein said switch structure further includes blocking and releasing means operatively associated with said inner shaft member and said direction indicator lever, for blocking the movement of said steering wheel in one direction, when said blinker switch means has previously been actuated by said direction indicator lever in the opposite direction, and conversely releasing said blinker switch means if it has been previously actuated in one direction, when said steering wheel is subsequently turned in the same direction.

18. An electro-magnetic device as defined in claim 13, wherein said switch structure further includes electromechanical locking means associated with said outer shaft member and energizable by said control means.

19. An electro-magnetic device as defined in claim 13, wherein each operating position further includes accelerator means, brake means and clutch means, as well as at least one signal lamp, and wherein each control means further includes control resistor means continuously adjustable by said accelerator means and in series connection with said switch means, first and second contacts acted upon by said brake means, said first contact for interrupting the current supplied to said motor and said second contact for simultaneously energizing said signal lamp, as well as solenoid means energized upon depression of said clutch means and serving to allow said gear-shift means to be manually operated.

20. An electro-magnetic device as defined in claim 19, wherein each operating position further includes catch means between said brake means and said clutch means, for mutually affecting the afore-named two means so that said brake means will be locked in its depressed braking position when said clutch means is not simultaneously depressed, and the locking action on said brake means will be released upon having said clutch means subsequently depressed.

21. An electro-magnetic device as defined in claim 19, wherein said control resistor means has biasing means thereat for urging the adjusting member thereof toward maximum resistance, and wherein the total strength of said voltage outputs is not effective except when said accelerator means is fully depressed against the force of said biasing means.

22. An electro-magnetic device as defined in claim 19, wherein each control means further includes electromechanical locking means acting upon said gear-shift means and de-activated upon depression of said clutch means, and wherein said first contact of the brake means is acted upon first and said second contact only thereafter when said brake means is depressed, so that said signal lamp goes off only after the connected one of said motors has been de-energized.

23. An electro-magnetic device as defined in claim 19, wherein each operating position further includes an electric horn selectively energizable with weak and with strong current derived from said current supply means, said weak current being applied when the latter is energized and serving to imitate the idling sound of the associated automobile, a horn switch for applying said strong current to said horn for signalling purposes, as well as a cut-off switch operated by said gear-shift means in all of said shift positions except the intermediate neutral positions, said cut-off switch interrupting said weak current applied to said horn.

24. An electro-magnetic device as defined in claim 19, wherein each co-ordinate system includes peripheral rail means and carriage means displaceable along said rail means, as well as slide means displaceable along said carriage means in a direction substantially perpendicular to that of said carriage means, said magnetic means being rigid with said slide means for movement in said radial directions therewith, one of said motors being stationary and displacing said carriage means while the other motor is secured to said carriage means and displaces said slide means.

25. An electro-magnetic device as defined in claim 24, wherein said gear-shift means includes a gate with an I-shaped cut-out and a shift lever movable in said cut-out so as to be manually set into said two shift positions in each of said two levels, said solenoid means positively locking said shift lever except when said solenoid means is de-activated upon depression of said clutch means.

References Cited by the Examiner

UNITED STATES PATENTS

| 2,122,116 | 6/1938 | Spicer | 273—1 |
| 2,630,765 | 3/1953 | Small | 46—45 |
| 2,639,545 | 5/1953 | Pastorius | 46—240 |
| 2,663,967 | 12/1953 | Mathis | 273—1 X |
| 2,721,742 | 10/1955 | Whitlock | 46—240 X |
| 2,806,323 | 9/1957 | Oback | 46—240 |
| 3,119,190 | 1/1964 | Cafulli et al. | 35—11 |
| 3,151,865 | 10/1964 | Faure et al. | 35—11 |

FOREIGN PATENTS

| 820,165 | 11/1937 | France. |
| 1,144,200 | 10/1957 | France. |
| 836,617 | 4/1952 | Germany. |
| 669,167 | 3/1952 | Great Britain. |

EUGENE R. CAPOZIO, *Primary Examiner.*

GEORGE NINAS, JEROME SCHNALL, *Examiners.*

SHELDON M. BENDER, *Assistant Examiner.*